United States Patent
Cortez

(10) Patent No.: US 11,555,365 B2
(45) Date of Patent: Jan. 17, 2023

(54) HYDRAULICALLY SET LINER TOP PACKER

(71) Applicant: Steve Cortez, Katy, TX (US)

(72) Inventor: Steve Cortez, Katy, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 64 days.

(21) Appl. No.: 16/711,717

(22) Filed: Dec. 12, 2019

(65) Prior Publication Data

US 2021/0180419 A1 Jun. 17, 2021

(51) Int. Cl.
| | |
|---|---|
| *E21B 23/03* | (2006.01) |
| *F16B 7/04* | (2006.01) |
| *E21B 23/10* | (2006.01) |
| *E21B 23/01* | (2006.01) |
| *E21B 43/10* | (2006.01) |

(52) U.S. Cl.
CPC .............. *E21B 23/03* (2013.01); *E21B 23/01* (2013.01); *E21B 23/10* (2013.01); *F16B 7/0413* (2013.01); *E21B 43/10* (2013.01)

(58) Field of Classification Search
CPC .......... E21B 23/03; E21B 23/01; E21B 23/10; E21B 43/10; E21B 33/12; F16B 7/0413
See application file for complete search history.

(56) References Cited

U.S. PATENT DOCUMENTS

| | | | | |
|---|---|---|---|---|
| 5,188,180 | A | * | 2/1993 | Jennings ................. E21B 23/04 166/338 |
| 2016/0145958 | A1 | * | 5/2016 | Richards ................. E21B 23/04 166/65.1 |
| 2016/0186511 | A1 | * | 6/2016 | Coronado ............. E21B 33/129 166/381 |
| 2018/0245429 | A1 | * | 8/2018 | Bhadbhade ............... H01F 7/17 |
| 2018/0340381 | A1 | * | 11/2018 | Zhou ....................... E21B 25/00 |

* cited by examiner

*Primary Examiner* — Dany E Akakpo
(74) *Attorney, Agent, or Firm* — Cantor Colburn LLP

(57) ABSTRACT

A liner and a method of setting the liner. The liner includes an outer tubular member, a hydraulic actuator on an outer surface of the outer tubular member for hydraulically setting a packer of the liner, and a hydraulic channel for directing fluid through the outer tubular member and into the hydraulic actuator to set the packer. The hydraulic channel has a first port at an inner surface of the outer tubular member and a second port at the outer surface of the outer tubular member at an axial location of the hydraulic actuator. The first port is at a different axial location of the outer tubular member than the second port. A fluid is pumped through the hydraulic channel into the hydraulic actuator to set the packer.

19 Claims, 2 Drawing Sheets

HYDRAULICALLY SET LINER TOP PACKER

BACKGROUND

In the resource recovery industry, a liner can be used as a string that is anchored or suspended from inside a previous casing string already disposed in a wellbore. The liner can be run into the wellbore using a running tool and secured in the wellbore using a liner hanger and liner top packer, which are often activated using a combination of hydraulic and mechanical devices. Historical configurations limit design options and performance Therefore, there is a desire for different methods for configuring and actuating liner hangers and liner top packers.

SUMMARY

In one aspect, a liner is disclosed. The liner includes an outer tubular member, a hydraulic actuator on an outer surface of the outer tubular member for hydraulically setting a packer of the liner, and a hydraulic channel for directing fluid through the outer tubular member and into the hydraulic actuator to set the packer, the hydraulic channel having a first port at an inner surface of the outer tubular member and a second port at the outer surface of the outer tubular member at an axial location of the hydraulic actuator, wherein the first port is at a different axial location of the outer tubular member than the second port.

In another aspect, a method of setting a liner is disclosed. A liner is deployed in the wellbore. The liner includes an outer tubular member, a hydraulic actuator on an outer surface of the outer tubular member for hydraulically setting a packer of the liner, and a hydraulic channel through the outer tubular member having a first port at an inner surface of the outer tubular member and a second port at the outer surface of the outer tubular member at an axial location of the hydraulic actuator, wherein the first port is at a different axial location of the outer tubular member than the second port. A fluid is pumped through the hydraulic channel into the hydraulic actuator to set the packer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
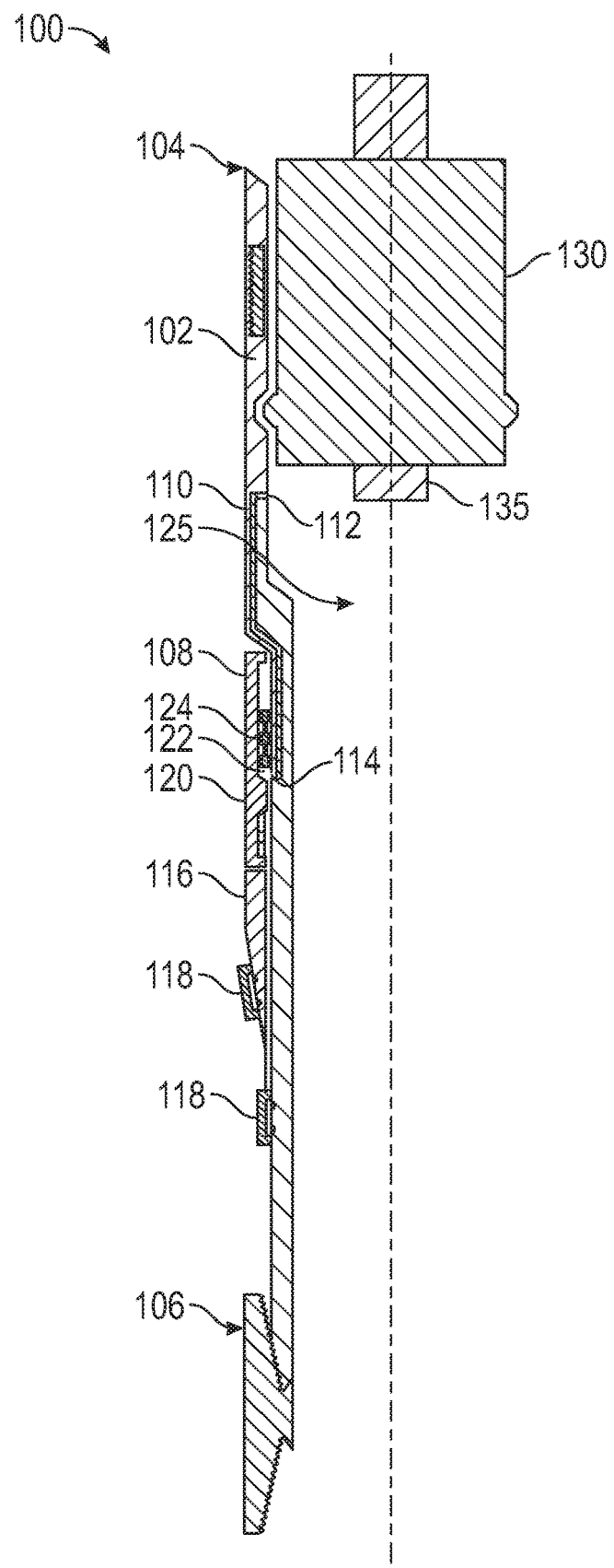
FIG. 1 shows a partial cross-sectional side view of a liner.

Referring to FIG. 1, a partial cross-sectional side view of a liner 100 is illustrated. The liner 100 includes an outer tubular member 102 that extends axially from a first end 104 to a second end 106. When deployed vertically in a wellbore, the first end 104 is located above or "uphole" of the second end 106. A hydraulic actuator 108 is disposed on an outer surface of the outer tubular member 102. A hydraulic channel 110 passes through the outer tubular member 102. The hydraulic channel 110 includes a first port 112 located at an inner surface of the outer tubular member 102 and a second port 114 located at an outer surface of the outer tubular member 102. The first port 112 is located closer to the first end 104 than the second port 114. In various embodiments, the first port 112 may be uphole of the second port 114 by a distance from about 10 feet (3 meters) to about 30 feet (10 meters).

The outer tubular member 102 is in the form of a shell having an outer surface, an inner surface and a radial thickness. The first port 112 opens to a bore 125 formed in the interior of the outer tubular member 102. The hydraulic channel 110 passes through the shell to exit into the hydraulic actuator 108 at the second port 114. In various embodiments the hydraulic channel 110 passes through the shell in an axial or longitudinal direction, such that the first port 112 opens to the bore 125 at a location uphole of the second port 114. As illustrated in FIG. 1, the hydraulic channel 110 can alter its course as necessary to maintain its location within the shell at it traverses the axial direction of the outer tubular member 102

The outer tubular member 102 further includes a wedge 116 and a packer 118 disposed on its outer surface. In order to set the packer, the hydraulic actuator 108 moves from a first axial location to a second axial location along the outer surface of the outer tubular member 102. In various embodiments, the second axial location is downhole of the first axial location or closer to the second end 106 than the first axial location. By moving the hydraulic actuator 108 to the second axial location, the wedge 116 is forced toward the second end 106 and into packer 118, thereby forcing the packer radially outward to engage a wall of the wellbore or an outer casing or suitable structure.

In another embodiment, the packer 118 is disposed between the wedge 116 and the hydraulic actuator 108. The wedge 116 is stationary with respect to the outer tubular member 102 and an inclined face of the wedge is oriented uphole to receive the packer 118. As the hydraulic actuator 108 moves axially from the first axial location to the second axial location, the hydraulic actuator moves the packer 118 onto the inclined face of the wedge 116, thereby moving the packer radially outward to engage the wellbore wall, outer casing or suitable structure.

The hydraulic actuator 108 includes a sleeve 120 that forms a chamber 122 between the sleeve and the outer surface of the outer tubular member 102. The hydraulic actuator 108 can include a chamber seal 124 that defines a wall of the chamber 122, with a size of the chamber being based on a hydraulic pressure within the chamber 122. The sleeve 120 of the hydraulic actuator 108 is capable of moving from a first axial location of the outer tubular member to a second axial location of the outer tubular member 102. In both the first axial location and the second axial location of the sleeve 120, the chamber 122 is in fluid communication with the hydraulic channel 110. In other words, in both axial locations, the second port 114 opens into the chamber 122. In another embodiment, the chamber 122 is in fluid communication with the hydraulic channel 110 when the sleeve 120 is in the first axial location but not when the sleeve is in the second axial location. Fluid from the bore 125 is pumped into the hydraulic channel 110 at the first port 112 and flows through the hydraulic channel 110 to enter into the chamber 122 at the second port 114. The hydraulic pressure in the chamber 122 therefore increases from a first hydraulic pressure to a second hydraulic pressure, thereby causing the sleeve 120 to move axially. At the first hydraulic pressure, the sleeve 108 is located at the first axial location. At the second hydraulic pressure, the sleeve 120 moves to the second axial location, thereby moving the wedge 116 and to engage the packer 118 to the wellbore wall or suitable structure.

In various embodiments, the liner 100 can be run downhole via a running tool 130. A pump 132 or other hydraulic pressure device can also be run downhole via the running tool 130 alongside the liner 100. Once the liner 100 and the pump 132 are at a selected downhole location, the pump can be activated to pump fluid from the bore 125 into the hydraulic channel 110 and thus into the hydraulic actuator 108, thereby engaging the packer 118 to the wellbore wall or suitable structure. The running tool 130 and pump 132 can be removed uphole once the packer 118 is engaged.

Figures 2A, 2B, 2C:
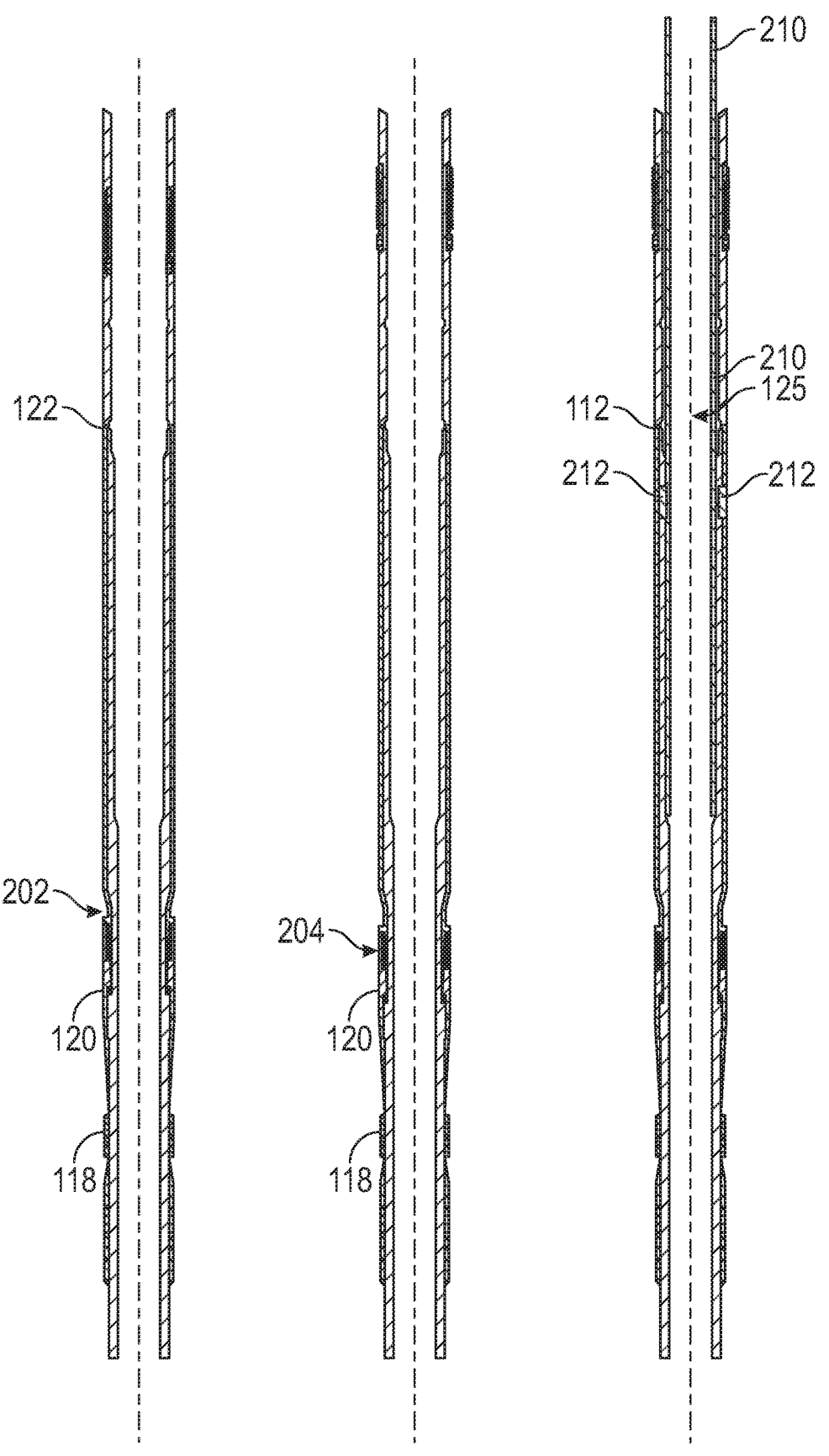
FIGS. 2a and 2b show the liner of FIG. 1 in two different stages of deployment.
FIG. 2c shows the liner of FIG. 1 in a tied-back configuration.

FIGS. 2a and 2b show two different stages of deploying the liner 100 of FIG. 1. FIG. 2a shows an initial deployment stage in which the liner 100 has been deployed to its selected downhole location. The sleeve 120 of hydraulic actuator 108 of the liner 100 is in its first axial location. FIG. 2b shows a second stage in which the packer is engaged to a wall or structure. Fluid is pumped through the hydraulic channel 110, causing the sleeve 120 to move from the first axial location 202 to second axial location 204.

FIG. 2c shows the liner of FIG. 1 in a tied-back configuration. FIG. 2c shows the liner 100 with the packer 108 secured in place and an inner tubular member 210 inserted therein. After the packer 108 has been engaged (in FIG. 2b), the running tool is removed to an uphole location and an inner tubular member 210 can be run into the bore 125 of the outer tubular member 102. The inner tubular member 210 is dimensioned below the first port 112, thereby ensuring fluid in the hydraulic actuator 108 is not trapped.

The inner tubular member 210 can be a tie-back pipe that extends to a surface location. In various embodiments, the inner tubular member 210 includes a pipe seal 212 that forms a seal between the tie-back pipe and the outer tubular member 102 at a location below the first port 112. Once installed, the inner tubular member 210 isolates the hydraulic actuator 108 or the chamber 122 of the hydraulic actuator from a pressure within the bore of the outer tubular member 102. With the inner tubular member 210 installed, the sleeve 120 can be maintained at its second axial location to engage the packer 118 until the inner tubular member 210 is removed. In various embodiments, an outer diameter of the inner tubular member 210 matches or substantially matches an inner diameter of the outer tubular member 102 at the first port 112.

Set forth below are some embodiments of the foregoing disclosure:

Embodiment 1

A liner. The liner includes an outer tubular member, a hydraulic actuator on an outer surface of the outer tubular member for hydraulically setting a packer of the liner, and a hydraulic channel for directing fluid through the outer tubular member and into the hydraulic actuator to set the packer, the hydraulic channel having a first port at an inner surface of the outer tubular member and a second port at the outer surface of the outer tubular member at an axial location of the hydraulic actuator, wherein the first port is at a different axial location of the outer tubular member than the second port.

Embodiment 2

The liner of any prior embodiment, wherein the hydraulic actuator moves from a first axial location of the liner at a first hydraulic pressure to a second axial location of the liner at a second hydraulic pressure to set the packer.

Embodiment 3

The liner of any prior embodiment, wherein a chamber of the hydraulic actuator is in fluid contact with the second port of the hydraulic channel in each of the first axial location and the second axial location.

Embodiment 4

The liner of any prior embodiment, wherein a chamber of the hydraulic actuator is in fluid contact with the second port of the hydraulic channel in only the first axial location only.

Embodiment 5

The liner of any prior embodiment, further comprising a hydraulic pump to pump fluid through the hydraulic channel to change a hydraulic pressure in the hydraulic actuator from the first hydraulic pressure to the second hydraulic pressure.

Embodiment 6

The liner of any prior embodiment, further comprising a wedge moveable axially by the hydraulic actuator in order to set the packer.

Embodiment 7

The liner of any prior embodiment, wherein the packer is moveable axially by the hydraulic actuator onto a wedge in order to set the packer.

Embodiment 8

The liner of any prior embodiment, further comprising an inner tubular member, wherein the inner tubular member is deployed within the outer tubular member after the packer has been set.

Embodiment 9

The liner of any prior embodiment, wherein the deployed inner tubular member is installed to form a seal below the first port to isolate the hydraulic actuator from a pressure in a bore of the outer tubular member.

Embodiment 10

A method of setting a liner. The method includes deploying the liner in a wellbore, the liner including an outer tubular member, a hydraulic actuator on an outer surface of the outer tubular member for hydraulically setting a packer of the liner, and a hydraulic channel through the outer tubular member having a first port at an inner surface of the outer tubular member and a second port at the outer surface of the outer tubular member at an axial location of the hydraulic actuator, wherein the first port is at a different axial location of the outer tubular member than the second port; and pumping a fluid through the hydraulic channel into the hydraulic actuator to set the packer.

Embodiment 11

The method of any prior embodiment, further comprising changing a hydraulic pressure in the hydraulic actuator to move the hydraulic actuator from a first axial location at a first hydraulic pressure to a second axial location of the liner at a second hydraulic pressure to set the packer.

Embodiment 12

The method of any prior embodiment, wherein a chamber of the hydraulic actuator is in fluid contact with the second port of the hydraulic channel in each of the first axial location and the second axial location.

Embodiment 13

The method of any prior embodiment, wherein a chamber of the hydraulic actuator is in fluid contact with the second port of the hydraulic channel in only the first axial location.

Embodiment 14

The method of any prior embodiment, further comprising deploying a hydraulic pump in the wellbore alongside the liner and pumping the fluid through the hydraulic channel via the pump.

Embodiment 15

The method of any prior embodiment, further comprising deploying the liner and the hydraulic pump in the wellbore together via a running tool.

Embodiment 16

The method of any prior embodiment, further comprising a moving a wedge axially by movement of the hydraulic actuator in order to set the packer.

Embodiment 17

The method of any prior embodiment, further comprising moving the packer axially by the hydraulic actuator onto a wedge in order to set the packer.

Embodiment 18

The method of any prior embodiment, further comprising deploying an inner tubular member within the outer tubular member after the packer has been set.

Embodiment 19

The method of any prior embodiment, further comprising installing the inner tubular member to form a seal below the first port to isolate the hydraulic actuator from a pressure in a bore of the outer tubular member.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A liner, comprising:
   an outer tubular member defining a bore;
   a hydraulic actuator configured to move axially on an outer surface of the outer tubular member to hydraulically set a packer of the liner;
   a hydraulic channel for directing fluid in the bore through the outer tubular member and into the hydraulic actuator to move the hydraulic actuator axially to set the packer, the hydraulic channel having a first port at an inner surface of the outer tubular member and a second port at the outer surface of the outer tubular member at an axial location of the hydraulic actuator, wherein the first port is uphole of the second port; and
   a hydraulic pump in the bore uphole of the first port for pumping fluid from the bore through the hydraulic channel, wherein the hydraulic pump is removable from the bore once the packer is engaged.

2. The liner of claim 1, wherein the hydraulic actuator moves from a first axial location of the liner at a first hydraulic pressure to a second axial location of the liner at a second hydraulic pressure to set the packer.

3. The liner of claim 2, wherein a chamber of the hydraulic actuator is in fluid contact with the second port of the hydraulic channel in each of the first axial location and the second axial location.

4. The liner of claim 2, wherein a chamber of the hydraulic actuator is in fluid contact with the second port of the hydraulic channel in only the first axial location.

5. The liner of claim 2, wherein pumping fluid from the bore through the hydraulic channel changes a hydraulic pressure in the hydraulic actuator from the first hydraulic pressure to the second hydraulic pressure.

6. The liner of claim 1, further comprising a wedge moveable axially by the hydraulic actuator in order to set the packer.

7. The liner of claim 1, wherein the packer is moveable axially by the hydraulic actuator onto a wedge in order to set the packer.

8. The liner of claim 1, further comprising an inner tubular member, wherein the inner tubular member is deployed within the bore of the outer tubular member after the packer has been set to isolate the hydraulic actuator from a pressure in the bore.

9. The liner of claim 8, wherein the deployed inner tubular member is installed to form a seal below the first port.

10. A method of setting a liner, comprising:
    deploying the liner in a wellbore, the liner including:
        an outer tubular member defining a bore;

a hydraulic actuator configured to move axially on an outer surface of the outer tubular member to hydraulically set a packer of the liner; and a hydraulic channel through the outer tubular member having a first port at an inner surface of the outer tubular member and a second port at the outer surface of the outer tubular member at an axial location of the hydraulic actuator, wherein the first port is uphole of the second port;

using a hydraulic pump in the bore uphole of the first port, pumping a fluid from the bore through the hydraulic channel into the hydraulic actuator to move the hydraulic actuator axially to set the packer; and removing the hydraulic pump from the bore once the packer is engaged.

11. The method of claim 10, further comprising changing a hydraulic pressure in the hydraulic actuator to move the hydraulic actuator from a first axial location at a first hydraulic pressure to a second axial location of the liner at a second hydraulic pressure to set the packer.

12. The method of claim 11, wherein a chamber of the hydraulic actuator is in fluid contact with the second port of the hydraulic channel in each of the first axial location and the second axial location.

13. The method of claim 11, wherein a chamber of the hydraulic actuator is in fluid contact with the second port of the hydraulic channel in only the first axial location.

14. The method of claim 11, further comprising deploying the hydraulic pump in the bore and pumping the fluid from the bore through the hydraulic channel via the pump.

15. The method of claim 14, further comprising deploying the liner and the hydraulic pump in the wellbore together via a running tool.

16. The method of claim 11, further comprising moving a wedge axially by movement of the hydraulic actuator in order to set the packer.

17. The method of claim 11 further comprising moving the packer axially by the hydraulic actuator onto a wedge in order to set the packer.

18. The method of claim 11, further comprising deploying an inner tubular member within the bore of the outer tubular member after the packer has been set to isolate the hydraulic actuator from a pressure in the bore.

19. The method of claim 18, further comprising installing the inner tubular member to form a seal below the first port.

* * * * *